2 Sheets—Sheet 1.
E. PIERCE.
BREECH LOADING BOMB GUN.
No. 10,392. Reissued Oct. 9, 1883.
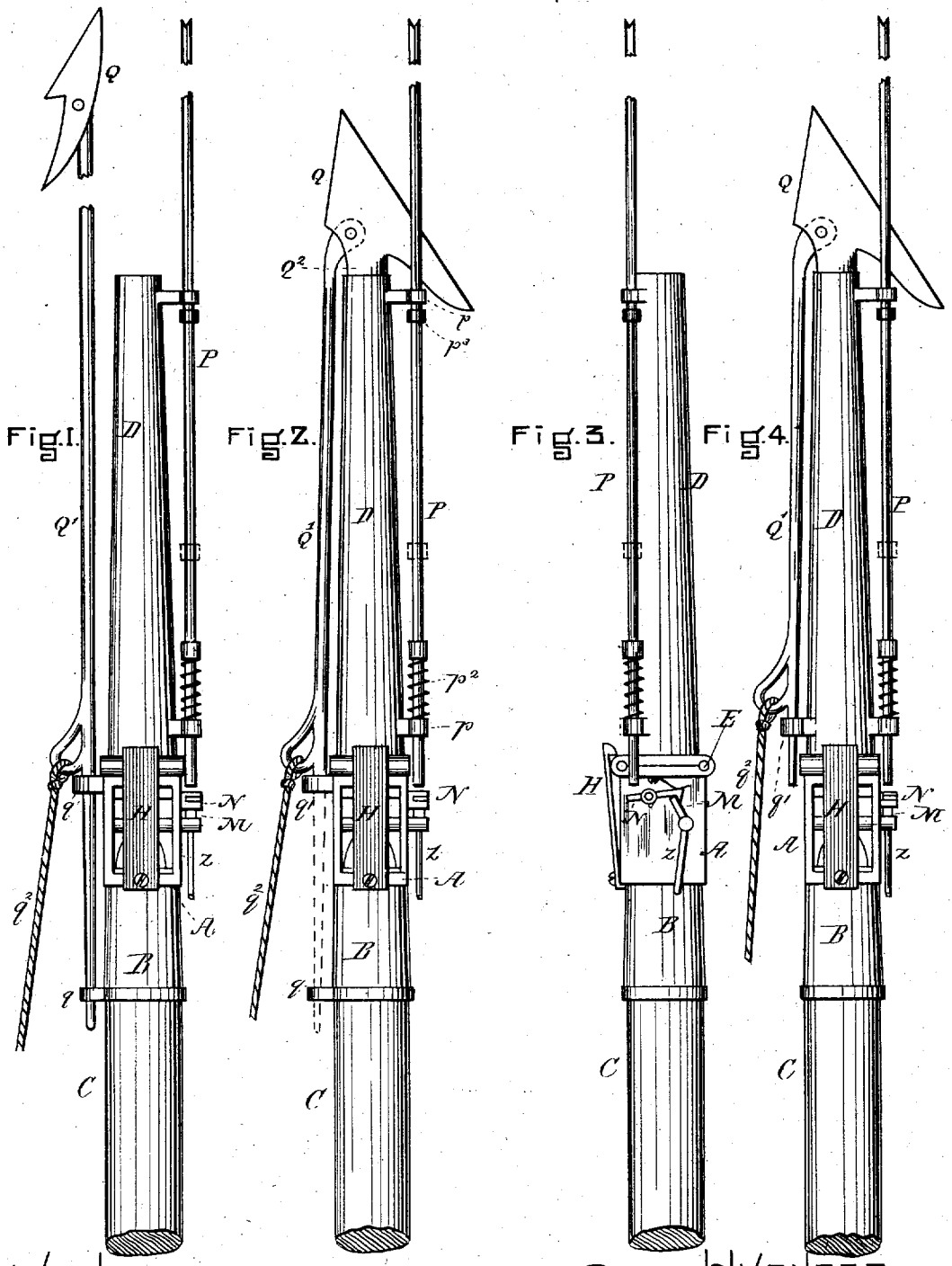
WITNESSES
Fred Harris
William J. Medley.
INVENTOR
Ebenezer Pierce
by his attys
Clarke & Raymond
N. PETERS, Photo-Lithographer, Washington, D. C.

2 Sheets—Sheet 2.
E. PIERCE.
BREECH LOADING BOMB GUN.
No. 10,392. Reissued Oct. 9, 1883.
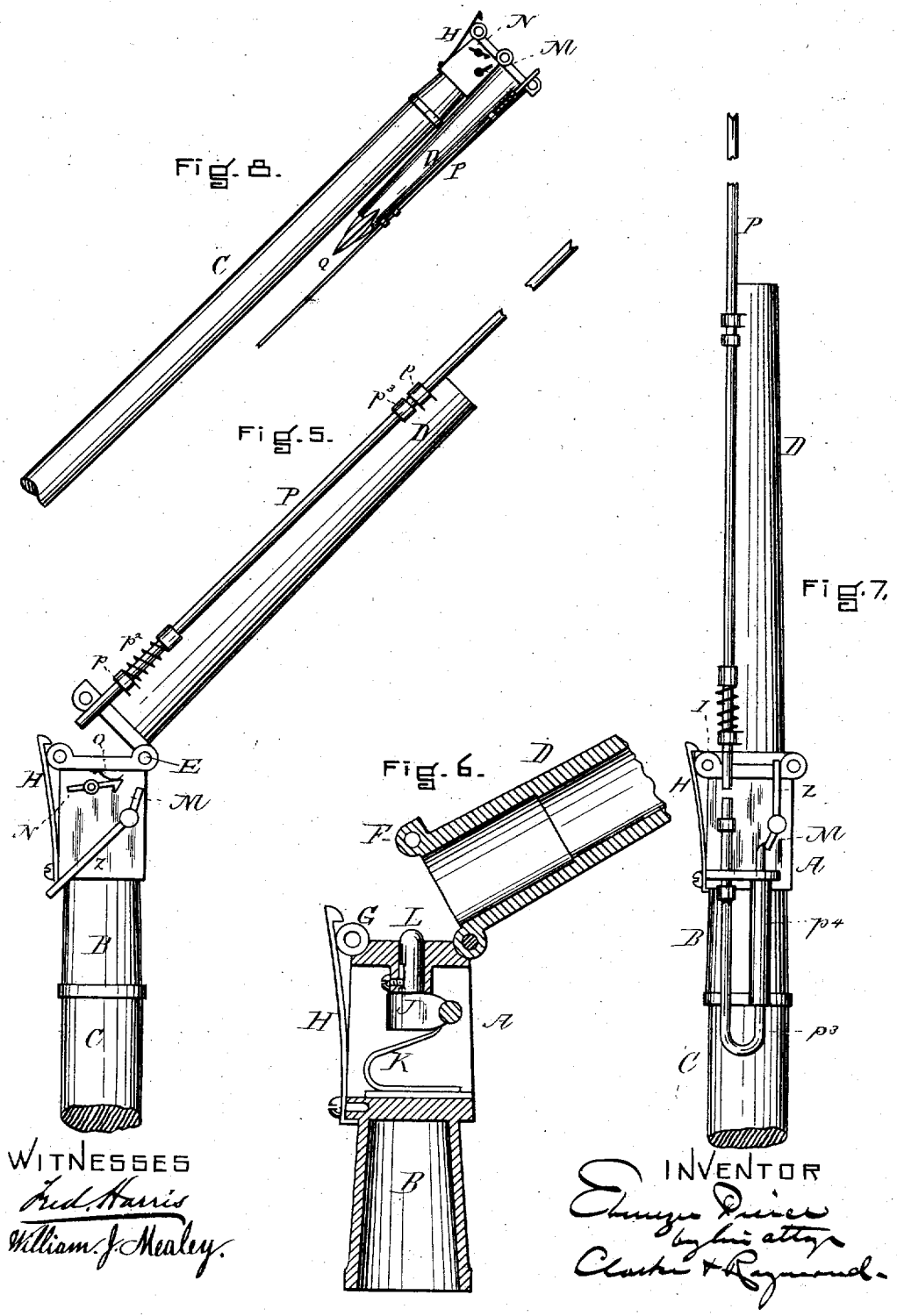
WITNESSES
Fred. Harris
William J. Mealey.
INVENTOR
Ebenezer Pierce
by his attys
Clarke & Raymond.
N. PETERS, Photo-Lithographer, Washington, D. C.

UNITED STATES PATENT OFFICE.

EBENEZER PIERCE, OF NEW BEDFORD, MASSACHUSETTS.

BREECH-LOADING BOMB-GUN.

SPECIFICATION forming part of Reissued Letters Patent No. 10,392, dated October 9, 1883.

Original No. 256,041, dated April 4, 1882. Application for reissue filed August 14, 1883.

*To all whom it may concern:*

Be it known that I, EBENEZER PIERCE, a citizen of the United States, residing at New Bedford, in the county of Bristol and State of Massachusetts, have invented new and useful Improvements in Breech-Loading Bomb-Guns for Killing Whales, of which the following is a specification.

The object of the present invention is to furnish a combined bomb gun and harpoon in which effectual provision is made for loading the gun in a simple and expeditious manner without necessity of detaching the barrel, as in the patent granted to me on the 28th day of January, 1879, No. 211,777.

The invention consists, essentially, in combining a hinged gun-barrel carrying a hammer-tripping rod with a breech-block containing the firing devices, whereby the charge can be quickly introduced and the barrel turned back on the breech or stock for taking up less space in transporting and storing the weapon.

The invention further consists in using, in connection with a barrel capable of turning on a hinge or other form of joint, a divided hammer or trigger retaining rod which will not only serve to release said hammer when shifted by impact against the body of the whale, but will enable said barrel to be thrown down or turned away from the breech-block without the necessity of removing any of the parts.

The invention further consists of a breech-loading bomb-gun wherein the hollow breech-piece contains a firing apparatus, and a catch is provided to engage with a tumbler-tooth on the hammer-axis, and, when the gun is cocked, of a push-rod on the exterior of said breech-piece, adapted, when pushed, to release said tumbler-tooth, in combination with a barrel, and hinged to the upper edge of one of the sides of said breech-piece, and latched or pinned to the upper edge of the opposite side of said breech-piece.

The invention further consists in the employment, in a breech-loading bomb-gun, of a flat-surfaced breech-piece, and having a barrel hinged thereto at one of the upper edges of said breech-piece on the line of the flat surface between the barrel and the breech-piece, which barrel and breech-piece are latched or pinned together at the edge opposite the hinge.

In the accompanying drawings, Figure 1 is a top view of a bomb gun and harpoon having the harpoon-shank fitted in guides on the breech frame or block, and provided with a hammer-tripping rod sliding in guides on the barrel and terminating at the breech-frame. Fig. 2 is a top view of a bomb gun and harpoon in which a bomb with a harpoon-head is fitted into the barrel, and is projected therefrom by the explosive charge. Fig. 3 is a side elevation of a bomb-gun, showing more fully the manner of hinging the barrel and the arrangement of the hammer-tripping rod. Fig. 4 is a top view of a bomb gun and harpoon in which the harpoon-shank moves in a guide on the barrel, and the bomb-harpoon is projected by the explosive charge. Fig. 5 is a side elevation, showing the position of the barrel when being dropped down for inserting the cartridge or removing the empty shell. Fig. 6 is a longitudinal section of the breech-block, firing devices, and hinged barrel. Fig. 7 is a modified form of gun in which is employed a divided hammer retaining and releasing rod. Fig. 8 is a side elevation, showing the barrel turned on the breech-frame for transporting or storage purposes.

The letter A designates the breech frame or block of my improved bomb gun and harpoon; and B is the socket formed with or attached to said breech-frame for receiving the customary staff or handle, C, which is used for poising and throwing the gun and its attached harpoon.

The gun-barrel D is connected with the bottom of the breech-block by means of a knuckle or other suitable form of hinge joint, E, so as to permit said barrel to be dropped down or turned away from the breech in a manner common to the well-known system of knockdown breech-loading fire-arms. The upper portion of the rear end of the barrel has a rearwardly-projecting lump or projection, F, which, when the barrel is turned against the face-plate of the breech-block, enters between perforated ears or lugs G on the top of said breech-block, and also engages with the hook-shaped extremity of a spring catch or plate, H, secured to the breech-block. This spring-catch serves, in connection with a locking-pin, I, passed through the ears or lugs G and the projection F on the barrel, to hold the latter in a locked position. Other well-known means for locking the barrel may, however, be resorted to, and instead of causing the barrel to turn on a hinge-joint in the manner shown, it may be fitted on a horizontal pivot-pin, so as to be capable of receiving an axial or rotary movement in respect to the breech-block. I prefer, however, the hinged joint, as represented in the drawings.

The hammer J and its mainspring K are arranged within a chamber of the breech-block, and the firing-pin L projects through and moves in the face-plate of the latter, so as to properly fire the charge upon being struck by the hammer. Suitable top and bottom plates serve to close the hammer-chamber and prevent access of water thereto. The journal or axis pins of the hammer project through the side plates of the chambered breech-block, and one of said axis-pins projects more than the other, and carries a projection or pawl, M, which is adapted to engage with a trigger, N, pivoted to the face-plate of the breech-block. When the hammer is properly set, by means of a lever, arm, or handle, Z, applied to its projecting journal or axis, the projection or pawl M thereof is received and retained by the hooked end of the trigger N. A spring, O, bearing against said trigger, serves to hold it in engagement with the projection of the hammer, so as to maintain the latter in a cocked position, as is clearly shown in Fig. 1.

A sliding rod, P, fitted in suitable guides, $p$, on the sides of the gun-barrel, projects a suitable distance beyond the outer end of the gun-barrel, so that when said rod is pushed back by impact against the body of the whale it will serve to disengage the trigger from the hammer by coming in contact with said trigger. This operation necessarily causes the hammer to strike the firing-pin, and the latter fires the charge in the well-known manner. A spiral spring, $p^2$, encircles the sliding rod, and serves to hold it away from the trigger until it is forced back in the manner above stated. A stop, $p^3$, on the rod P serves to limit the forward movement thereof by coming in contact with one of the guides $p$ on the barrel.

The letter Q designates a harpoon-head, which is pivoted to its shank Q′, so that it can turn thereon for taking a firm hold in the body of the whale when the harpoon-line is pulled taut. As shown in Fig. 1, the shank of the harpoon has no connection with the barrel of the gun, but is fitted in guides or eyes $q$ $q'$ on the side of the breech block or frame. In this instance of construction, the barrel, together with the hammer-tripping or releasing rod P, are alone movable in relation to the breech for permitting the charge to be introduced into the barrel or the empty shell to be removed therefrom.

The harpoon-head shown in Figs. 2 and 4 is provided with an explosive shell or magazine, which fits into the barrel of the gun, and has its charge ignited by the concussion of the explosive charge used for projecting this form of bomb-harpoon into the body of a whale. In the form of gun illustrated in Figs. 2 and 4 the hammer-tripping rod is made to project beyond the harpoon-head, so that it will come in contact with the body of the whale and release the hammer for firing the charge that projects the bomb-harpoon from the gun-barrel. As shown in Fig. 2, the pivoted harpoon-shank has no connection with the gun-barrel, except through the medium of the harpoon-head and its attached bomb or shell. The harpoon-shank may, however, be extended, as shown in dotted lines in this figure, so as to pass through the eyes $q$ and $q'$ on the breech-frame.

The form of harpoon-head illustrated in the present instance is particularly adapted to take a firm hold in the body of the whale, and it is not liable to glance off when it strikes a bone, as is the case with the ordinary form of harpoon-head. This latter liability is avoided by pivoting the shank at or near the center of the harpoon-head and providing the latter with an oblique wing or blade, as is shown in the drawings. The construction illustrated in Fig. 7 involves the use of a gun-barrel of the description above described; but in place of the single straight hammer-disengaging rod, I provide, in connection with such a hinged barrel, a divided disengaging-rod having a bent rear portion, $p^3$, which is adapted to slide in guides $p^4$ on the breech-block, as in my Patent No. 211,777, heretofore referred to. The bent rod in the present instance serves directly as a stop for holding the hammer in a cocked position, it being obvious that when the short arm of the rod rests above the projection of the hammer axis or shaft said hammer is held in a retracted state. As soon as the rod passes beyond the projection of said hammer-shaft, the mainspring will throw it forward against the firing-pin.

By dividing the bent rod or making it in two parts, the barrel can be shifted without disturbing the position of said rod.

Of course it is well understood that as breech-loading guns have long been in use, no attempt is made in this application to broadly claim a breech-loading bomb-gun; but by making the bomb-gun breech-loading by hinging the barrel to the breech-piece it is found to be far more serviceable and convenient than in my patent hereinbefore referred to, in which the barrel is not hinged, but must be entirely detached from the breech-piece for loading.

It will also be observed that by making the breech-piece flat, and placing the hinged joint E and the center of the hole in the lump F and of the holes in the lugs G on the line of junction between the barrel and the breech-piece, and also substantially coincident with the upper edge of the breech-piece, the separation of the barrel from the breech-piece and its reattachment thereto is made with the minimum addition of amount of weight to the structure, which, in a weapon that is to be thrown by hand before it is fired, and which it is desirable to be able to cast as far as possible, is a thing of no little importance.

It is obvious that if in the present instance the rod for firing the gun were held by guides both upon the barrel and the breech-piece, as is the case in my said patent, the barrel could not be turned upon the hinges for purposes of loading; but by carrying the sliding rod which operates the firing mechanism by impact, as before described, solely upon guides on the barrel, the barrel can be turned upon its hinge for the purpose of loading without detaching the rod therefrom. Therefore the rod will be in position on the barrel of the gun at all times, and always ready, so that after the insertion of a cartridge the barrel can be closed, and the gun will be ready for instant action without necessitating the attaching of the rod. Moreover, the rod cannot be lost, which, were it detachable, would often occur.

What I claim is—

1. In a breech-loading bomb-gun, the combination of a hinged barrel with the breech-piece carrying firing devices, and a sliding rod adapted to connect with and actuate the firing devices by impact, as described, said rod being arranged in guides on the hinged barrel to move therewith during the act of inserting a cartridge or charge in the barrel of the gun when it is turned on its hinge, as and for the purpose set forth.

2. The combination, with a breech-loading bomb-gun, of the divided sliding rod which operates the mechanism employed for firing the charge by impact, one portion of said rod being supported by a guide upon the breech-piece, and the remaining part of the rod being supported by guides upon the barrel, whereby the barrel can be turned back on its hinge without disconnecting either of the rods, substantially as described.

3. In a breech-loading bomb-gun wherein a hollow breech-piece contains the firing apparatus, and a catch is provided to engage with a tumbler-tooth on the hammer-axis when the gun is cocked, a push-rod on the exterior of said breech-piece, adapted, when pushed, to release said tumbler-tooth, in combination with a barrel hinged to the upper edge of one of the sides of said breech-piece, and latched or pinned to the upper edge of the opposite side of said breech-piece, substantially as described.

4. In a breech-loading bomb-gun, a flat-surfaced breech-piece having a barrel hinged thereto at one of its upper edges on a line with the surface of said breech-piece, and latched or pinned thereto at the opposite edge, substantially as described.

EBEN. PIERCE.

Witnesses:
FRED. HARRIS,
WILLIAM J. MEALEY.